O. W. ROBINS.
ICE EDGER.
APPLICATION FILED DEC. 15, 1911.
1,042,481.
Patented Oct. 29, 1912.
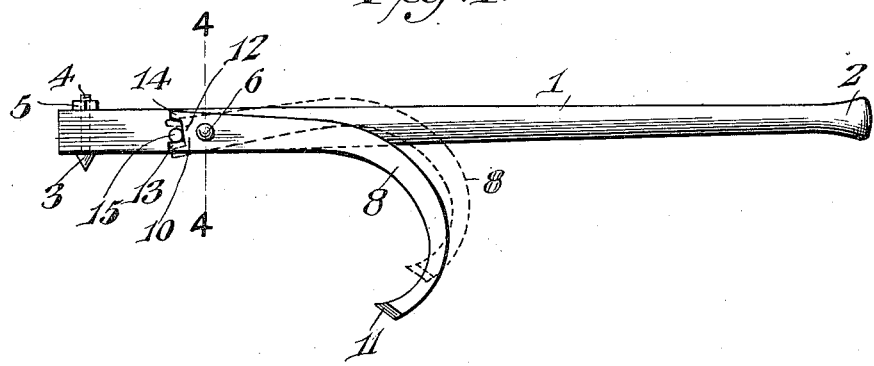
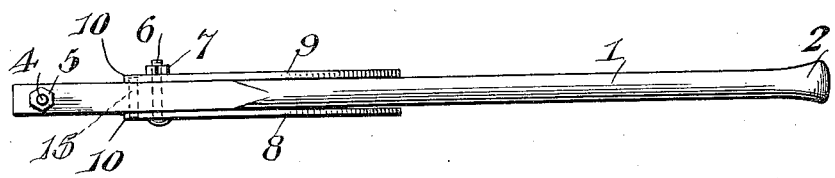
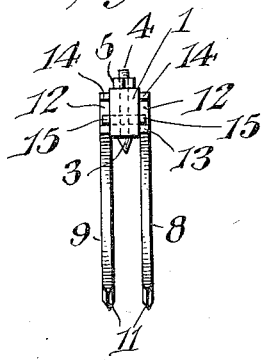
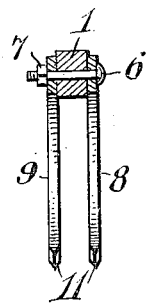
Oliver W. Robins, Inventor

UNITED STATES PATENT OFFICE.

OLIVER W. ROBINS, OF CEDAR RAPIDS, IOWA.

ICE-EDGER.

1,042,481. Specification of Letters Patent. Patented Oct. 29, 1912.

Application filed December 15, 1911. Serial No. 666,028.

*To all whom it may concern:*

Be it known that I, OLIVER W. ROBINS, a citizen of the United States, residing at Cedar Rapids, in the county of Linn and State of Iowa, have invented a new and useful Ice-Edger, of which the following is a specification.

This invention relates to tools for use in handling ice, and specifically an ice edger, or a tool by which large cakes of ice may be readily turned from a position on one side to a position on edge for more convenient storing and handling.

The invention comprises generally speaking a lever provided at one end with a spur to engage in one side of the cake, and also provided with one or more hooks pivotally mounted to the lever for limited movement, said hooks arranged to engage in the edge of the cake and hold the lever in fixed relation thereto during the turning operation.

The invention as thus outlined and as hereinafter particularly claimed, will be readily understood from the following detailed description based upon the accompanying illustrative drawings, wherein is shown the preferred embodiment of the invention, it being understood that various alterations in the configuration and arrangement of the parts within the scope of the claims may be resorted to without materially sacrificing the advantages of the invention.

In these drawings:—Figure 1 is a side view of an ice edger constructed according to this invention. Fig. 2 is a top plan view of the same. Fig. 3 is an end view, and Fig. 4 is a vertical transverse section on the line 4—4 of Fig. 1.

In the drawings, the lever 1 is shown as a straight bar provided at one end with a handle 2 and at the opposite end with a spur 3 formed by the pointed head of the bolt 4 arranged transversely of the lever 1 and held in place by a nut 5. A pivot bolt 6 is also arranged transversely of the lever at right angles to the bolt 4 and at a slight distance therefrom. This bolt held in position by the nut 7 serves as a pivotal mounting for a pair of hooks 8 and 9 arranged on opposite sides of the lever 1 and transfixed by said bolt at a point a slight distance from their shank end 10. The rear portion of the hooks is formed somewhat in the form of a letter J and provided with terminal sharp ends 11 facing to the front. The shanks of the hooks are provided in their forward ends each with a notch 12 bounded by the two lugs 13 and 14, and a stud pin 15 transversely mounted in the lever 1 slightly in advance of the pivot bolt 6 has projecting ends resting within the notch 12 between the lugs 13 and 14, whereby the pin and lugs serve as a stop to delimit the pivotal movement of the hooks, so as to facilitate the engagement and release of the ice cakes by the tool. The arc within which the hooks shall be permitted to move may be varied to meet different conditions of use, but for edging ice cakes it has been found to be advantageous to pivot the hooks for movement within an arc of approximately fifteen degrees.

What is claimed is:—

1. A device of the character described including a lever, a hook pivoted to the lever and having its shank extended beyond its pivotal point and provided with an end notch, and a fixed stop projecting laterally from the lever and extending into the said notch to form a stop to delimit the arc of movement of the hook.

2. A device of the character described including a lever consisting of a straight bar and having at one end a fixed laterally projecting spur, a pair of hooks pivoted to the bar upon opposite sides thereof in rear of the spur and having forwardly extending terminal engaging points to coöperate with the same, said hooks being arranged in spaced relation for independent movement, and stops to delimit the arc of movement of the hooks.

3. In a device of the character described, a lever having at one end a lateral spur, a pair of hooks pivoted to the lever upon opposite sides in spaced relation for independent movement, the shanks of the hooks extended beyond their pivotal point and provided with end notches, and a stud projecting laterally from the lever within the notch to form stops to delimit the arc of movement of the hooks.

4. In a device of the character described, a lever having at one end a laterally projecting spur, a pair of hooks pivoted to the lever upon opposite sides in spaced relation for concentric but independent movement in planes parallel to each other and to the plane of the spur, the shanks of the hooks extended beyond the pivotal point and provided with end notches, and a stud projecting laterally from the lever within the notch of each shank to limit the movement of the hooks within an arc of substantially fifteen degrees.

In testimony, that I claim the foregoing as my own, I have hereto affixed my signature in the presence of two witnesses.

OLIVER W. ROBINS.

Witnesses:
 EDGAR A. DAVIS,
 MURRAY ROBERTSON.